Dec. 22, 1959 M. L. KLEIN 2,918,669

ARBITRARY FUNCTION GENERATOR

Filed Aug. 24, 1956 2 Sheets-Sheet 1

INVENTOR.
MARTIN L. KLEIN

BY Frederic B. Schramm

ATTORNEY

Dec. 22, 1959 M. L. KLEIN 2,918,669

ARBITRARY FUNCTION GENERATOR

Filed Aug. 24, 1956 2 Sheets-Sheet 2

INVENTOR.
MARTIN L. KLEIN
BY Frederic B. Schramm
ATTORNEY

United States Patent Office 2,918,669

Patented Dec. 22, 1959

2,918,669

ARBITRARY FUNCTION GENERATOR

Martin L. Klein, Woodland Hills, Calif., assignor to North American Aviation, Inc.

Application August 24, 1956, Serial No. 606,013

4 Claims. (Cl. 340—355)

This invention relates to electrical circuits and generators and concerns particularly means for generating a desired waveform.

Such waveform generators may be used for various purposes including use in analog computers, testing recording instrumentation and other applications where periodic continuous waveforms are required. The waveforms may be used, for example, for checking the response of recording instruments or for generating functions for analog computation systems.

An object of the invention is to generate a desired electrical signal representing a given function of time with a repetition rate which may be adjusted readily over a wide range between high and low repetition rates.

A further object of the invention is to provide an arbitrary function generator with means for selectively adjusting the magnitude of different points of the output wave.

An additional object is to obtain drift-free operation without need for close voltage regulation.

Other and further objects, features and advantages of the invention will become apparent as the description proceeds.

In carrying out the invention in accordance with a preferred form thereof an arbitrary diode matrix is employed in conjunction with a plurality of voltage adjusters or potentiometers for arbitrarily setting voltages at different points of the wave and a serially connected bank of electronic switches, such as flip-flops, is provided for connecting successive lines of the diode matrix in sequence to an output terminal. For producing a recurrent curve with the waveform represented by the diode and potentiometer settings, a suitable oscillator generator, such as an adjustable multivibrator, is provided which triggers the flip-flop bank. Integrating circuits are provided for smoothing the voltage transition from one point of the wave to the next and preferably a phase restorer is provided.

A better understanding of the invention will be afforded by the following detailed description considered in conjunction with the accompanying drawings, in which—

Figure 1:
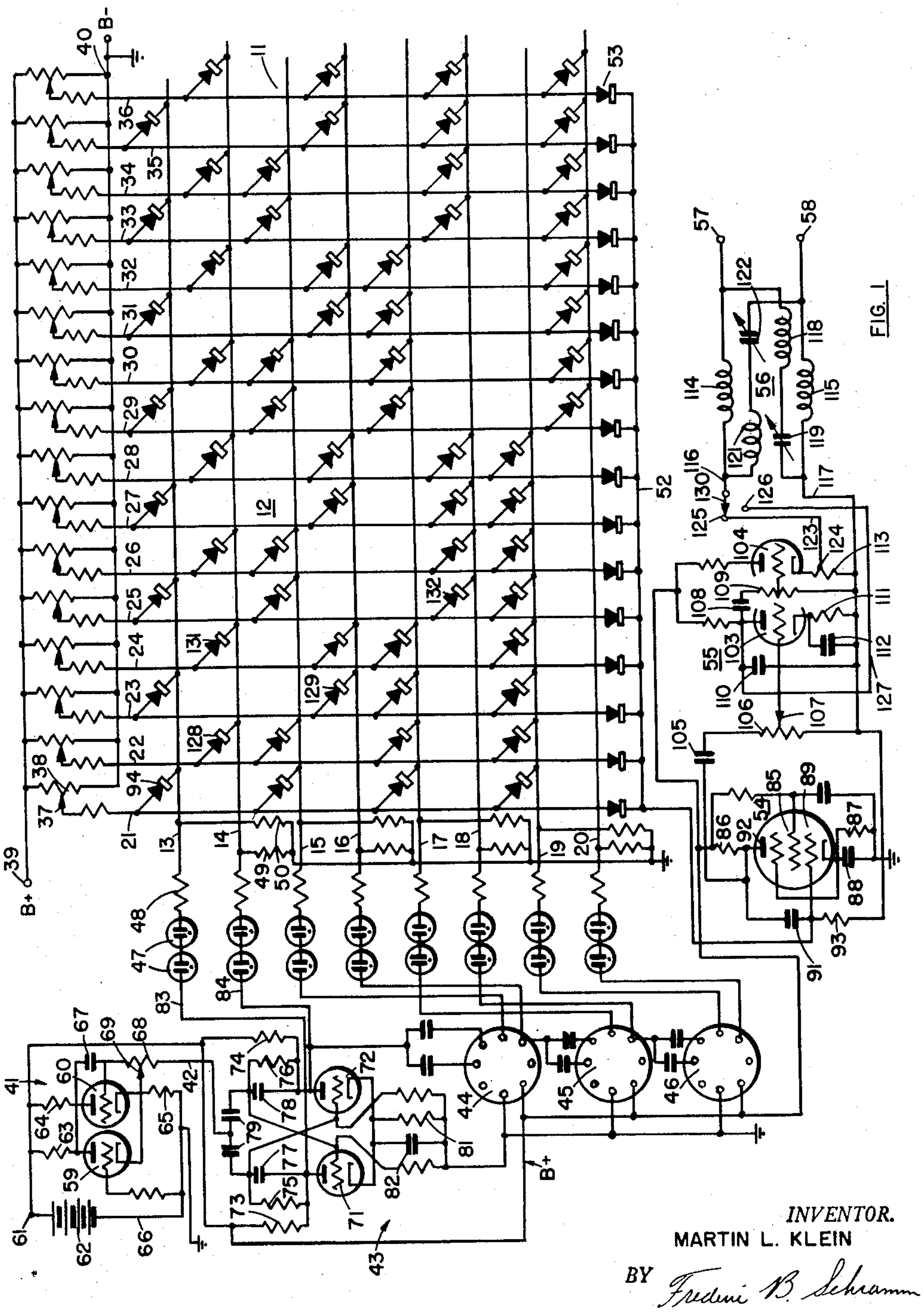
Figure 2:
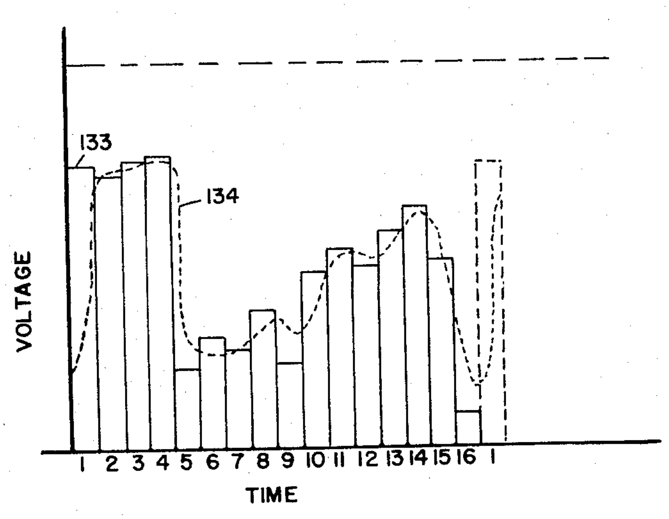

Fig. 1 is a circuit diagram, partially schematic, of an embodiment of the invention; and Fig. 2 is a graph illustrating the arbitrary voltage components of a waveform which may be produced by the apparatus of Fig. 1.

The form of apparatus illustrated in Fig. 1 comprises a diode matrix 11 with a plurality of switching lines 13, 14, 15, 16, 17, 18, 19 and 20, and a plurality of voltage lines 21–36, inclusive, for use in a 16-point waveform representation, for example. The switching lines 13–20 and the voltage lines 21–36, respectively, are interconnected through a plurality of diodes 12 arranged in a conventional pattern similar to that employed in digital signal representation. For example, as shown, diodes are connected to alternate voltage lines from switching lines 13—14. Pairs of diodes are connected to alternate pairs of voltage lines from the switching lines 15—16.

Groups of four diodes are connected to alternate groups of four voltage lines from switching lines 17—18, etc.

Each of the voltage lines 21–36 is connected to a voltage adjuster. As shown, the voltage adjusters take the form of potentiometers, each consisting of a sliding tap 37 and a resistor 38. Each of the resistors, such as resistor 38, is connected to a positive terminal 39 of a low voltage source at one end and to a negative terminal 40 of the low voltage source at the other end, which may be a grounded terminal, for example. Where the waveform to be produced has a maximum voltage under ten volts, the voltages 39 and 40 may be a ten volt source, for example. An adjustable frequency oscillator 41 is provided taking the form of a cathode-coupled multivibrator circuit, with an output line 42 taken from the cathodes to prevent frequency distortion by any fluctuations in output load.

For each pair of switching lines, such as the lines 13 and 14, there is a switching device such as a bistable multivibrator of the Eccles-Jordan type or a flip-flop circuit, only one of which, the circuit 43, is shown in detail. A flip-flop circuit for the switching lines 15 and 16 is schematically represented by a circle 44 corresponding to the base of a conventional plug-in flip-flop unit. Similarly, there is a flip-flop unit 45 for the lines 17 and 18 and a flip-flop unit 46 for the lines 19 and 20. The output or anode terminals of the flip-flops 43—46 are connected to the switching lines through indicators 47 and current limiting resistors 48. The indicators 47 are shown as neon-glow tubes. A pair of neon-glow tubes is connected in series to provide the requisite breakdown voltage.

All of the switching lines 13–20 are also grounded through separate resistors which, in the case of lines 13 and 14, consist of resistors 49 and 50.

All of the voltage lines 21–36 are connected to a common output line 52, each through a separate one of a plurality of diodes, such as diode 53. To the output line 52 is connected, in turn, an integrating circuit 54, shown as a pentode type of circuit with a smoothing circuit 55 connected to the output of the integrator 54 and a phase restoring network 56 interposed between the output of the circuit 55 and output terminals 57 and 58 at which the arbitrary selected waveform appears.

The multivibrator 41 comprises a pair of electronic discharge devices, such as triodes 59 and 60 connected to the positive terminal 61 of a power supply source 62 through anode resistors 63 and 64. There is a common cathode resistor 65 connected to the negative terminal 66 of the power supply 62. The tube 60 is coupled to the tube 59 by a condenser 67 and a resistor 68 which is adjustable for setting the repetition rate of the multivibrator 41. As shown, the resistor 68 has an adjustable tap 69 connected to the cathodes of the tubes 59 and 60, and the output line 42 of the multivibrator 41 is connected to free end of the resistor 68 so that the output voltage is derived from the cathodes of the tubes 59 and 60.

The flip-flops 43—46 are similar. As shown in detail in the flip-flop 43, there is a pair of electronic discharge devices, such as triodes 71 and 72 with anode resistors 73 and 74 connected to the positive terminal of a power supply, which may be the same power supply 62 as employed for the multivibrator 41. The triodes 71 and 72 are cross-coupled in accordance with the conventional flip-flop circuit, for example, that of the Eccles-Jordan type. For cross-coupling there are resistors 75 and 76 shunted by bypass condensers 77 and 78. Each shunt combination is connected between the anode of one flip-flop device and the control grid or electrode of the other.

For coupling the control grid of the triodes 71 and 72 to the output line 42 of the preceding stage, condensers 79 are provided. Bias for the tubes 71 and 72 is provided by a common cathode resistor 81 and a bypass condenser 82. As shown, the anode of the flip-flop tube 72 is connected to the switching line 13, through a line 83, and the anode of the flip-flop tube 72 is connected to the switching line 14 through a line 84. Capacitative coupling from the anode of the triode 72 to the input of the flip-flop 44 is provided, corresponding to the input coupling for the flip-flop 43 provided by the condensers 79. The flip-flops 44, 45 and 46 have corresponding input and output connections.

The integrator 54 comprises an electronic discharge tube, shown as a pentode 85 and an anode resistor 86 connected to the positive terminal 61 of the same voltage supply 62 as the other electronic discharge devices and has a cathode resistor 87 and a bypass condenser 88. The common output line 52 of the diode matrix 11 is directly connected to the control grid 89 of the pentode 85. For integrating the voltage appearing on the control grid 89 an integrating condenser 91 is connected between the anode 92 and the control grid 89 of the pentode 85. A grid resistor 93 is provided having such resistance in relation to the capacity of the condenser 91 as to provide the requisite time constant for integration of voltage segments in a waveform of the frequency range for which multivibrator 41 is designed.

Further integration and smoothing are obtained by stages 103 and 104 of the circuit 55 which comprises electrode discharge devices shown as triodes, for example. Triode 103 is coupled to the anode 92 of the pentode 85 through a condenser 105 and a resistor 106 having tap 107 to serve as a volume control and triode 104 is coupled to the triode 103 through a coupling condenser 108 and a tapped resistor 109. The triode 103 is provided with bias by means of a cathode resistor 111 and a bypass condenser 112, whereas the triode 104 is provided with a cathode resistor 113, with an output line 123 taken from a point 124 on the resistor 113 so that the triode 104 serves as a cathode follower.

The phase restorer 56 comprises a lattice of two series inductances 114 and 115 in two output lines 116 and 117, respectively, of the circuit 55 and diagonal arms consisting of an inductance 118 in series with an adjustable condenser 119 and another inductance 121 in series with an adjustable condenser 122. The condensers 119 and 122 are made adjustable in order to obtain more exact cancellation of phase distortion at different frequencies.

An integrating condenser 110 is connected between the anode of the tube 103 and ground in order that additional integrating effect may be accomplished in the stage 103.

For supplying relatively high-current low-impedance loads at terminals 57 and 58, the line 123 is drawn from the tap 124 of the cathode follower resistor 113. In order that the circuit may be adapted also for supplying high-impedance, relatively high-voltage loads a change-over switch is provided comprising a contact or terminal 125 connected to the line 123 and a contact or terminal 126 connected to a line 127 which is connected to the anode of the tube 103. A switch blade 130 connected to the line 116 is provided for cooperating with the terminals 125 and 126 for forming a change-over switch.

For each oscillation of the multivibrator 41 a negative pulse is supplied through the line 42 to the control grid of the flip-flop tubes 71 and 72, causing conductivity to shift from one tube to the other in the manner of conventional flip-flop counter operation. When the tube 72 is conducting and the tube 71 is non-conducting, the line 13 is at higher potential than the voltage supply line 21 of the diode matrix 11. Consequently, for this condition the cathode of the diode 94 is at higher potential than its anode and the diode 94 has no effect on the line 21, permitting the voltage thereof to appear at the output line 52 and the control electrode 89 of the pentode integrator 84. However, each of the other voltage supply lines 22–36 is shunted by one of the flip-flop tubes. For example, the line 22 is shunted by the flip-flop tube 72 through the conductor 84 and the diode 128. Shunting of the line 22, however, has no effect on the tube 85 because of the presence of diodes 53.

The line 23 is shunted by the second flip-flop in the unit 44 through the diode 129 and the line 16. Line 24 is shunted through the diode 131 and the flip-flop tube 72. Line 25 is shunted through the diode 132 and the second flip-flop of the unit 45. In a similar manner, all of the other voltage supply lines are shunted by flip-flops. However, with the next pulse of the multivibrator 41 the flip-flop triode 71 becomes conducting and the flip-flop 72 becomes non-conducting. The voltage of the line 22 appears at the control grid 89 of the integrator 85 whereas all of the other voltage supply lines are shunted by flip-flops. With the next oscillation of the multivibrator 41 the output of the flip-flop 43 transmits an impulse to the flip-flop unit 44 which causes a shift in conductivity of the units thereof so that the voltage supply line 23 becomes connected to the control grid 89 of the integrating unit 85. In this manner, with successive oscillations of the multivibrator 41 and successive shifts in conductivity of successive flip-flops, the voltages of successive voltage supply lines appear in successive increments of time at the control grid 89 of the integrator unit 54.

In the specific arrangement shown by way of example, it is assumed that the flip-flop circuits 43, 44, 45 and 46 are so selected and operated as to have plate swings between 100 volts and 180 volts. When the flip-flop tube 71 is non-conducting and its anode potential is 180 volts with respect to ground the neon glow lamps 47 in series with lines 83 and 13 are energized and supply the resistor network 48, 50 with about sixty volts to ground from the line 13. However, when the flip-flop tube 71 becomes conducting its anode voltage falls to one-hundred volts which is insufficient to keep the pair of neon glow tubes in series with line 83 ionized and they are extinguished. This drops the resistance network 48, 50 supplying the line 13 to ground potential. The voltage available to the line 13 is divided down by the resistor network 48, 50 so as not to overload the flip-flops. A similar operation takes place for the other flip-flops and lines.

If more voltage and power or either are desired to drive the lines of the matrix 11, cathode followers driven by the flip-flops may be employed. In this manner, the off-on neon glow tubes 47 can be eliminated by either connecting the flip-flops directly to the cathode follower grids or by two-resistor divider networks with the lower resistors connected to a negative voltage supply. If the cathode follower grid is connected to the midpoint of the network, the cathode follower output will be either zero volts or about plus forty volts for the example chosen. This would then allow a function voltage swing of about forty volts peak-to-peak maximum.

The circuit illustrated in Fig. 1 is arranged for producing sixteen voltages in succession for each cycle. The voltages may be arbitrarily chosen by the setting of the potentiometer taps so that successive increments of a waveform represented by blocks 133 of Fig. 2 are produced. The corners of these blocks are rounded out and the curve is smoothed by the integrating effect of the stages 85 and 103 to the form represented by the dotted line 134 and phase restoration is accomplished in the unit 56.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A function generator comprising a first plurality of conductive lines; a plurality of variable voltage sources, each connected to a respective line; a second plurality of conductive lines; a plurality of diodes, each connected to a respective line of each of said plurality of lines; means for controlling the potential level of each of said second plurality of lines whereby the conduction and nonconduction of said diodes is controlled; means for integrating currents indicating the conduction and nonconduction of said diodes.

2. An arbitrary function generator comprising in combination a logical matrix of diodes and adjustable potentiometers with a voltage source, cross-conductors and an output terminal, a multivibrator for applying a repetition rate to the matrix, a plurality of flip-flops interposed between the multivibrator and the matrix cross-conductors, an integrator connected to the matrix output terminal and having an integrator output terminal and a phase restorer connected to the integrator output terminal whereby the flip-flops successively connect the said cross-conductors to the matrix output terminal from the voltage source to the potentiometers and successive output voltage segments are applied to the integrator having magnitudes determined by the potentiometer settings.

3. An arbitrary function generator comprising in combination a logical matrix of diodes and adjustable potentiometers having a voltage source, cross-conductors and an output terminal, an oscillator for applying a repetition rate to the matrix, a plurality of two-position switching units interposed between the oscillator and matrix cross-conductors, an integrator connected to the matrix output terminal and having an output terminal and a phase restorer connected to the integrator output terminal, whereby the switching units successively connect the said cross-conductors to the matrix output terminal from the voltage source through the potentiometers and successive output voltage segments are applied to the integrator having a magnitude determined by the potentiometer settings.

4. An arbitrary function generator comprising in combination a logical matrix including a plurality of adjustable voltage sources for arbitrarily setting voltages corresponding to different points on a wave form of a predetermined function, said matrix having a plurality of conductive lines each responsive to a respective voltage source and a plurality of switching lines, a serially connected bank of electronic switches operative on said switching lines for connecting successive conductive lines in sequence to an output terminal, and an integrator responsive to the voltages at said output terminal for smoothing the voltage transition from one of said voltages corresponding to a point on said wave form to the next point on said wave form to generate a wave form corresponding to the wave form of said predetermined function.

References Cited in the file of this patent

UNITED STATES PATENTS

| | | |
|---|---|---|
| 2,570,716 | Rochester | Oct. 9, 1951 |
| 2,640,965 | Eaglesfield | June 2, 1953 |
| 2,721,318 | Barker | Oct. 18, 1955 |
| 2,739,285 | Windsor | Mar. 20, 1956 |

OTHER REFERENCES

Publication I: Proceedings of the I.R.E., February 1949, page 144.